(12) United States Patent
Kooijman et al.

(10) Patent No.: US 9,361,275 B2
(45) Date of Patent: Jun. 7, 2016

(54) METHOD FOR ANALYZING AN EDS SIGNAL

(71) Applicant: FEI Company, Hillsboro, OR (US)

(72) Inventors: Cornelis Sander Kooijman, Veldhoven (NL); Hendrik Jan de Vos, Eindhoven (NL)

(73) Assignee: FEI Company, Hillsboro, OR (US)

( * ) Notice: Subject to any disclaimer, the term of this patent is extended or adjusted under 35 U.S.C. 154(b) by 310 days.

(21) Appl. No.: 13/866,484

(22) Filed: Apr. 19, 2013

(65) Prior Publication Data

US 2013/0277555 A1 Oct. 24, 2013

Related U.S. Application Data

(60) Provisional application No. 61/635,710, filed on Apr. 19, 2012.

(30) Foreign Application Priority Data

Apr. 19, 2012 (EP) .................................. 12164724

(51) Int. Cl.
*G01T 1/18* (2006.01)
*G06F 17/18* (2006.01)
*G01T 1/17* (2006.01)
*G01T 1/36* (2006.01)
*G01T 1/16* (2006.01)

(52) U.S. Cl.
CPC . *G06F 17/18* (2013.01); *G01T 1/17* (2013.01); *G01T 1/36* (2013.01); *G01T 1/16* (2013.01)

(58) Field of Classification Search
CPC .................................... G01T 1/16; G01T 1/17
See application file for complete search history.

(56) References Cited

U.S. PATENT DOCUMENTS

| 5,349,193 | A | 9/1994 | Mott et al. |
| 6,369,393 | B1 * | 4/2002 | Jordanov ............. G01T 1/17 250/262 |
| 6,590,957 | B1 * | 7/2003 | Warburton ........ A61B 6/4241 378/5 |
| 7,490,009 | B2 | 2/2009 | Gottlieb et al. |

(Continued)

FOREIGN PATENT DOCUMENTS

GB 2197464 5/1988

OTHER PUBLICATIONS

Unknown, PNSensor Silicon Drift Detector Development, http://www.pnsensor.de/Welcome/Detector/SDD/index.html, retrieved Apr. 19, 2012, 6 pgs.

*Primary Examiner* — Christine Sung
(74) *Attorney, Agent, or Firm* — Michael O. Scheinberg; John E. Hillert; Scheinberg & Associates

(57) ABSTRACT

The invention relates to a method for analyzing the output signal of a silicon drift detector (SDD). A SDD is used for detecting X-rays emitted by a sample as a result of impinging radiation.
The signal of a SDD comprises a number of randomly spaced steps, in which the step height is a function of the energy of the detected X-ray photon.
The variance in step height is a function of the averaging time that can be used to determine the plateau between steps: averaging over a short interval results in more uncertainty of the plateau value than a long interval. By according a weight factor, a function of the variance such that a step with low variance (high reliability) is associated with a larger weight factor than a step with high variance (low reliability), measurement values with a low variance are emphasized. This results in better resolved spectra.

18 Claims, 6 Drawing Sheets

(56) References Cited

U.S. PATENT DOCUMENTS

| | | |
|---|---|---|
| 7,855,370 B2 | 12/2010 | Mott |
| 7,966,155 B2 | 6/2011 | Warburton et al. |
| 7,979,217 B2 | 7/2011 | Gottlieb et al. |
| 8,039,787 B2 | 10/2011 | Mott |
| 2006/0126763 A1 | 6/2006 | Barat et al. |
| 2009/0033913 A1* | 2/2009 | Mott .............................. 356/51 |
| 2011/0144922 A1 | 6/2011 | Corbett et al. |
| 2011/0301869 A1 | 12/2011 | Gottlieb et al. |
| 2013/0015351 A1 | 1/2013 | Kooijman et al. |
| 2013/0134307 A1 | 5/2013 | Routh, Jr. |

* cited by examiner

METHOD FOR ANALYZING AN EDS SIGNAL

This application claims priority from U.S. Provisional Application No. 61/635,710, filed Apr. 19, 2012, which is hereby incorporated by reference.

The invention relates to a method for analyzing a signal of a radiation sensor containing randomly spaced steps, the method comprising:
- detecting the presence of steps;
- estimating the time intervals between adjacent steps;
- filtering the signal preceding a step with a first filter behavior;
- filtering the signal following a step with a second filter behavior;
- estimating the step height; and
- from the multitude of steps form a density distribution or histogram according to the estimated step height.

The invention further relates to an apparatus for performing the method.

Such a method is known from US patent publication No. U.S. Pat. No. 7,966,155 B2.

The known patent describes a method for analyzing a signal from an X-ray detector such as a solid state detector or a gas proportional detector. In a solid state detector an X-ray photon impinges on a solid state device such as a PIN diode or a silicon drift diode. The photon generates a number of electron/hole pairs, which are collected and fed to a signal amplifier. The number of electron/hole pairs depends on the energy of the X-ray photon, and thereby each photon causes a step in the signal of the detector, the step height depending on the energy of the photon.

Such detectors are used in, for example, electron microscopes. In an electron microscope a sample is exposed to a beam of energetic electrons with selectable energy of, for example, between 10 and 30 keV. The electrons interact with the sample material, and cause X-rays to emerge from the sample material. Part of the electrons cause so-called characteristic X-rays to emerge from the sample, the energy depending on the element with which the electrons interacts and thus comprising information of the sample material. By determining the energy, the sample composition can thus be determined.

When determining the signal of the X-ray detector, the signal shows noise, such as flicker noise, 1/f noise, etc. The height of the step is the difference between the signal preceding the step and the signal following the step (the preceding plateau and the following plateau), and the noise in the signals translate to an error or inaccuracy of the estimate of the step height. The noise in the signal can be lowered by adequate filtering, thereby 'smoothing' the plateau values. However, when another photon is detected while the detector is still filtering the signal, an error occurs, and both the old step and the new step should be discarded. This is known as pile-up. Therefore fast detection and low noise detection are contradicting demands: for fast detection (high count rate), filtering with a shorter time constant must be used, but this results in a large noise of the signal, and thus a larger inaccuracy of the step height.

Another contribution to the inaccuracy of the step height is due to the Fano noise: the number of electron/hole pairs generated by a photon with a given energy varies, as described by the Fano noise.

The known patent describes a method in which the signal of a detector is sampled and stored. The steps are detected, and the time interval between each pair of the steps is then estimated. According to this time interval, an appropriate filter is applied to the signal between the two steps forming the pair, as a result of which the filter condition between each pair of steps is optimized.

The thus found estimates of the step heights are used to form a density distribution or histogram displaying the step height. This is also known as a spectrum.

It is noted that, when the signal is filtered with a filter behavior (time constant) that depends on the time interval between steps, this is known as adaptive filtering.

It is further noted that the filtering behavior of the filter used to filter the signal preceding a step need not be identical to the filtering behavior used to filter the signal following said step: the filtering need not be symmetrical.

It is also noted that preferably the sampling comprises a analogue-to-digital conversion, and the filtering is a digital filtering, and may include processing by, for example, a Finite Impulse Response (FIR) filter. The different filtering behaviors then correspond to using different tap-coefficients and tap-lengths.

It is mentioned that pile-up occurs when two steps occur too close together to process them separately with an acceptable accuracy. It that case both counts are rejected, thereby effectively lowering the count rate.

Even though analyzing the signal using adaptive filtering is an improvement over analyzing the signal using non-adaptive filtering, there is a need for an improved method of analyzing the signal.

The invention intends to provide such an improved method.

To that end the method according to the invention is characterized in that
- the variance of the step height estimate is estimated using an estimate of the variance of the plateau preceding the step and an estimate of the variance of the plateau following the step, the estimates of the variance of the plateaus based on the length of the interval of each of the plateaus and a model taking into account the length of the interval and the noise behavior of the signal, and
- each of the multitude of steps contribute to the density distribution or histogram according to a weight factor, the weight factor a function of the variance, the function such that a step with a low variance is associated with a larger weight factor than a step with a high variance, as a result of which step height estimates with a low variance, corresponding to a high reliance, are emphasized.

Inventors found that, when processing a signal, weighting the steps with a low variance (a high reliability) with a larger weight factor than steps with a high variance (a low reliability) resulted in a spectrum that was smoother and also showed peaks with a smaller Full Width at Half Maximum (FWHM). This is explained as follows:
when using adaptive filtering, it is possible to chose the filter behavior of the signal preceding the step different for the filtering behavior of the signal following the step. When the signal is sampled N times per second, and assuming that the signal preceding a step is filtered with a time constant covering $N_1$ samples, and the signal following the step is filtered with a time constant covering $N_2$ samples, then the plateau preceding the step has a variance $\sigma_1$ proportional to $1/N_1$ and the plateau following the step has a variance $\sigma_2$ proportional to $1/N_2$. The step height thus has a variance $\sigma_T$ proportional to $(1/N_1+1/N_2)$. The steps with a small variance (high reliability) are likely to be close to the true value, and therefore it makes sense to emphasize these steps, instead of giving steps with a low reliability the same weight as reliable data.

It is noted that, although it is suggested that an infinitely long sample range ($N \to \infty$) results in the lowest variance, this is only true for white noise. An electric signal need not show a white noise behavior, for example as a result of 1/f noise.

Terminology: a probability density function is typically only defined for a continuous random variable: it is a function describing the likelihood for this random variable to occur at a given point. The probability for the random variable to fall within a particular region is given by the integral of this variable's density over the region. The probability density function is nonnegative everywhere, as negative probabilities do not exist. Its integral over the entire space equals one.

It is noted that not every probability distribution has a density function: for example the distributions of discrete random variables do not.

A signal as analyzed in this invention is normally sampled by an n-bit analogue-to-digital convertor (ADC), and strictly speaking the result is not a continuous variable. It is possible to represent such discrete random variables as well by using a generalized function such as the Dirac delta function. This substantially unifies the treatment of discrete and continuous probability distributions. Therefore statistical characteristics of such a discrete variable (such as its mean and its variance) can be used analogous to the characteristics for a continuous distribution.

Another solution is the use of a histogram, in which each measured value is represented as a measurement value in an interval or bin. Typically these bins all have the same size.

The use of the variance to emphasize steps is suggested in US patent application number US2006/126763A1. Here it is suggested for a similar signal that the energy (step height) estimated should contribute to the spectrum according to the quality of the estimate. This prior art differs in how to determine the quality (variance): where this prior art document suggest the use of a Kalman filter or determining an estimate by performing matrix multiplications, the invention of applicant bases the variance, and thus the quality of the signal, on the length of the intervals preceding and trailing the edge. More specifically this prior art does not suggest to use the length between steps to determine the quality of the estimated step height.

It is noted that for white noise the length of the interval can be used directly (as can be the output of a Kalman filter as proposed in US patent application number US2006/126763A1), but for other noise behavior, (red noise, pink noise, or most probable bath-tub noise) a correction can be used. For the method according to this invention this can be based on the use of a Look Up Table (LUT).

In a further embodiment each step is represented by a step height and a step variance, and the contribution of the step to the density distribution or histogram according to a weight factor takes the form of a contribution proportional to a probability distribution function.

By adding the contribution of the different steps as a probability distribution, for example by assuming that each step is represented by a unity area Gaussian with an expectance value and a deviation, an even better approximation is possible.

When using a histogram this implies that a very reliable measurement (showing a low variance) gives a high contribution to a small number of bins, while a measurement with low reliability (high variance) gives a small contribution to a larger number of bins.

It is noted that, when the sum of the contributions to all bins is always equal, already a weight factor is used (the weight factor proportional to a probability distribution), but that good results can be achieved by, for example, a further increase of the weight factor for measurements showing a low variance. In other words: to make the sum of the contributions also dependent on the variance.

Although explained for a histogram, this can be realized in a similar way for density distributions.

In another embodiment the signal is the signal of a solid state device and the steps are the result of X-ray photons impinging on said solid state detector.

A solid state detector comprises a solid state device, for example a PIN diode or a silicon drift diode, followed by a voltage follower or a charge amplifier. The detector also comprises a signal processor, that processes the signal of, for example, the charge amplifier. The step height of the signal is approximately proportional to the energy of the impinging X-ray photon being detected.

In another embodiment the weight factor equals zero for steps with a variance above a predetermined threshold.

This is equivalent to rejecting steps separated by a period less than a predetermined value, as is done in standard pile-up detection. Although rejecting steps lowers the count rate (as steps are rejected) this may improve the FWHM value of the spectrum.

In an aspect an apparatus for observing X-rays emerging from a sample in response to a stimulus, the apparatus comprising an X-ray detector, the X-ray detector a solid state device or a gas proportional counter, the X-ray detector producing a signal showing steps, the signal processed by a signal processor programmed to detect the presence of steps, estimate the time interval between the steps, filter the signal preceding the step with a first filter behavior, filter the signal following the step with a second filter behavior, estimate the step height, and from the multitude of step form a density distribution or histogram according to the estimated step height, is characterized in that the signal processor is equipped to estimate the variance of the step height and is equipped to assign a weight factor to each of the multitude of steps contributing to the density distribution or histogram, the weight factor a function of the variance.

Preferably the signal processor is a programmable signal processor, programmed to perform the steps to analyze the signal from the X-ray detector.

In a preferred embodiment the stimulus is a beam of electrons.

In for example a Scanning Electron Microscope, a Scanning Transmission Electron Microscope and Electron Micro Probe analyzer, an energetic beam of electrons with an adjustable energy of typically between several keV's and several hundreds of keV's is focused and scanned over the sample. X-rays emerging from the sample are detected by detectors, and the energy of the characteristic X-rays is used to determine the (place dependant) composition of the sample. The signal of the detector, typically a solid state detector, is processed by a signal processor. By improving the processing of the signal, an improved energy resolution (and thus improved compositional analysis) is provided.

Preferably the signal processor is a programmable signal processor, as this enables upgrades of the firmware of the processor.

As an alternative stimulus a beam of X-rays can be used, the X-rays generated by an X-ray tube and stimulating the sample to emit X-rays by X-ray fluorescence.

BRIEF DESCRIPTION OF THE DRAWINGS

The invention is now elucidated using figures, in which identical reference numerals indicate corresponding features. To that end.

DETAILED DESCRIPTION OF PREFERRED EMBODIMENTS

Figure 1:
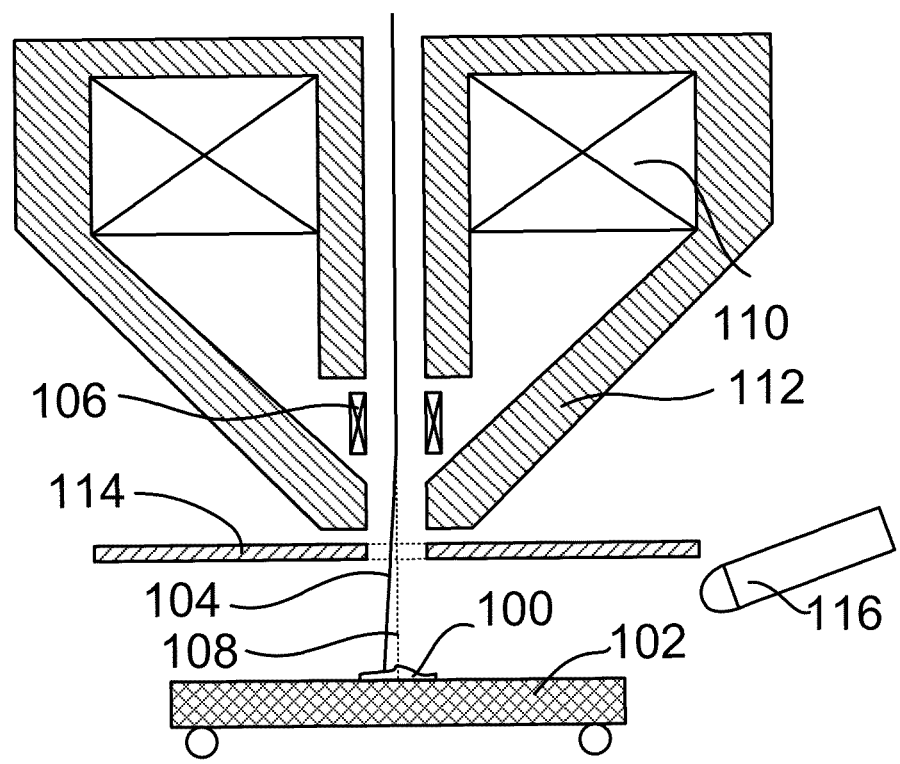
FIG. 1 schematically shows a sample and a solid state device.

FIG. 1 schematically shows a sample and a solid state detector.

The sample 100, mounted on a movable sample holder 102, is irradiated by a focused electron beam 104, the electrons forming the electron beam having a selectable energy of typically between 10 keV and 40 keV when observing X-rays.
The focusing lens is a magnetic objective lens comprising a yoke 112 and a coil 110. A deflection coil 106 is used to deflect the beam from the axis 108 and scans the beam over the sample. The electrons cause radiation to emerge from the sample, the radiation comprising secondary electrons (with an energy of less than 50 eV), backscattered electrons (with an energy of more than 50 eV), photons of visible light, and X-ray photons. A solid state device 114 in the form of a wafer comprising a silicon drift diode, the wafer showing a central through-hole, is positioned between the lens and the sample in such a position that the beam of electrons passes through the through-hole and part of the X-ray photons emerging from the sample impinge on the devices to be detected. Detector 116 is used to detect other radiation emerging from the sample, such as secondary electrons.

The X-rays are generated from a small volume of the sample, typically 1 µm³ or less. As the beam is scanned over the sample, a map can be made showing what X-rays emerge from which position of the sample. By showing the energy of the emerging photons in, for example, false colors, positional information of the composition of the sample can be given. By analyzing the sample with a stationary beam an analysis of a single spot can be made.

It is noted that, when imaging a sample by detecting other types of radiation than X-rays, for example using secondary electrons, an electron beam with an energy as low as 500 eV or even less can be used. The resolution of such an image is much better than the resolution of the X-ray image, and is typically between 1 and 5 nm. However, at such a low energy the electrons have insufficient energy to cause X-rays in excess of 500 eV to emerge from the sample, and thus to analyse many materials of interest. For efficient X-ray generation of many materials of interest a beam energy in excess of 5 keV, preferable in excess of 10 keV, should be used.
It is further noted that for a fast analysis a large portion of the X-ray photons should be detected. This implies that the detectors as seen from the sample have to cover a large acceptance angle. To achieve this a detector in the form of a wafer with a central hole is preferred, the beam passing through the lens and through the central hole to the sample. In this manner a large acceptance angle of the detector can be realized, resulting in a large fraction of the X-ray photons being detected. However, this can also be realized by placing a number of detectors side by side between lens and sample around the axis.

Figure 2A:
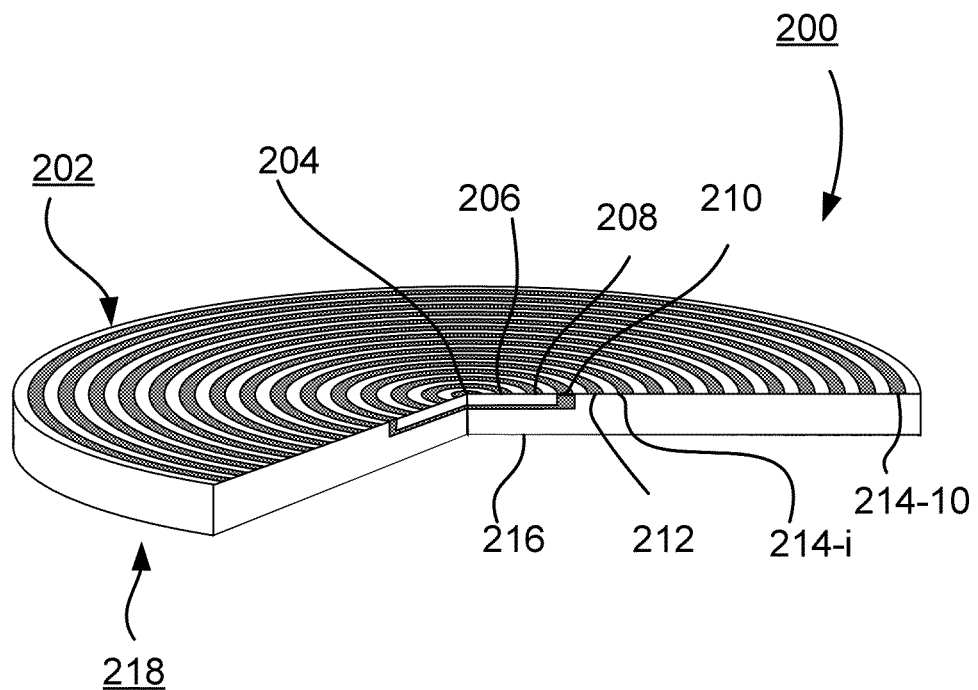
FIGS. 2A and 2B schematically shows a solid state device in the form of a silicon drift diode.

FIG. 2A schematically shows a solid state device in the form of a silicon drift diode.

It is noted that, for simplicity, a device without a central through hole is shown A silicon drift diode is formed on/in a silicon wafer 200, showing a volume of high purity, or at least showing little recombination sites, between a first side 202 and a second side 218. Side 218 is the side sensitive to radiation (X-rays). Side 202 comprises the anode 212 as well as a number of electrodes 214-$i$, and side 218 comprises the cathode 216. In working a voltage difference is present between anode 212, cathode 216 and electrodes 214-$i$, as a result of which electrons of any electron/hole pairs generated in the volume between these two sides will drift to the anode 212 and the holes to the cathode 216 or any of electrodes 214-$i$. Side 202 shows a central electrode 204 forming the drain of a FET. An electrode 206 surrounding the central electrode forms the gate of the FET, and electrode 208 surrounding electrode 206 forms the source of the FET. The FET is shielded from the rest of the silicon wafer by a shield electrode 210 surrounding electrodes 204, 206 and 208, both laterally and 'inside' the wafer. The anode 212 is connected to the gate of the FET (connection not shown in FIG. 1A).

Surrounding the anode a number of concentric electrodes 214-$i$ are formed. The innermost of these concentric electrodes is connected to a voltage close to the anode voltage, the successive rings 214-$i$ connected to voltages increasing from slightly above the anode voltage for the innermost of these electrodes to a voltage close to or equal to the cathode voltage for the outermost electrode.
The ring electrodes 214-$i$ cause a field inside the wafer that guides all electrons from the generated electron/hole pairs to the anode, the anode being a small structure and showing only a small capacitance with respect to the cathode.

It is noted that, in working, a voltage difference is applied to the anode/cathode. Hereby the capacitance of the anode with respect to the cathode is reduced. Silicon drift diodes with an anode capacitance of only 0.15 pF in working are commercially available.

It is further noted that it is known to form on one wafer a number of silicon drift diodes, and place the FET far from the middle. This enables the use of a central through hole, as described in FIG. 1. An example of such a device is, for example, the Rococo2 detector of PNSensor Gmbh, Munich, Germany (http://www.pnsensor.de/Welcome/Detector/SDD/index.html). Also silicon drift diodes with a central hole for passing a beam of electrons, the beam generated by an electron microscope column, are known.

Figure 2B:
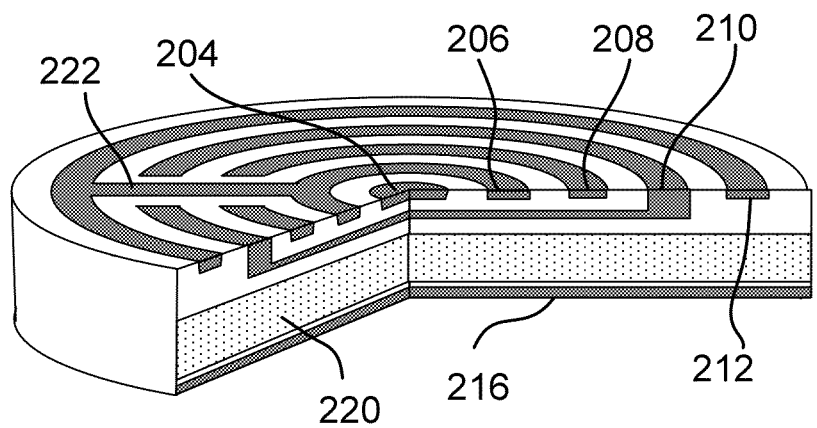

FIG. 2B schematically shows a detail of the silicon drift diode shown in FIG. 1A. FIG. 2B shows the part from the centre until the anode. Here the connection between anode 212 and the gate of the FET is schematically shown as a metallization 222. Underneath cathode 216 the sensitive volume 220 is shown. X-rays incident on the sensitive surface penetrate into the volume and generate in this volume a number of electron/hole pairs. The amount of electron/hole pairs depends on the energy of the photon.
Charge accumulates on the anode forcing the voltage of the anode to become more and more negative (with respect to the cathode) until a reset of the anode is caused by resetting the anode with, for example, a reset diode (not shown).

Alternatively leakage current from the drain of the FET to its gate can be used to compensate for the average charge accumulation.

It is noted that often a feedback capacitor is integrated on the silicon drift diode, connecting the anode to an output, but this capacitor can also be placed outside the silicon drift diode.

Figure 3:
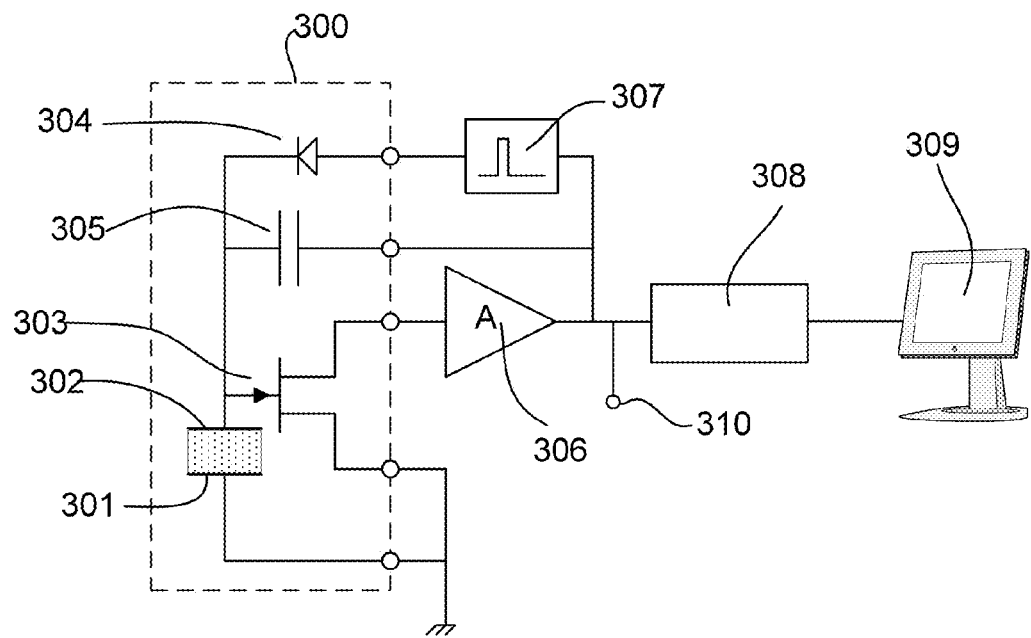
FIG. 3 schematically shows a solid state detector.

FIG. 3 schematically shows the detector circuitry of a detector equipped with a silicon drift diode.

A silicon wafer 200 comprises an intrinsic volume 300 in which photons generate electron/hole pairs. The intrinsic volume is part of a diode with a cathode 302 and an anode 301. The electrons of the electron/hole pair drift towards the cathode, and the holes are collected at anode. The gate of a FET 303 placed on the wafer is connected to the cathode, and its source is connected to an amplifier 306 that is placed outside the wafer. A capacitor 305 on the wafer provides a feed-back from the output of the amplifier to the gate of the FET, thereby causing the FET and amplifier to act as a charge amplifier. A pulse generator 307 monitors the output signal of the charge amplifier, and when its voltage rises above a threshold level, a pulse is generated that, via a diode 304 on the wafer, discharges the capacitance and thereby resets the charge amplifier. The signal at the output of the charge amplifier, present on pin 310, is fed to a signal processor 308, which processes the signal and generates a spectrum on monitor 309.

It is noted that the signal processor may also provide information of the sample in another way, for example by giving a list of elements and their abundance, or by providing a list of possible mineral composition. The latter is especially attractive when the processor cooperates with, for example, the positional resolution capabilities of a Scanning Electron Microscope or the like, and an image is provided that shows position dependent material composition in, for example, false color coded images.

Figure 4:
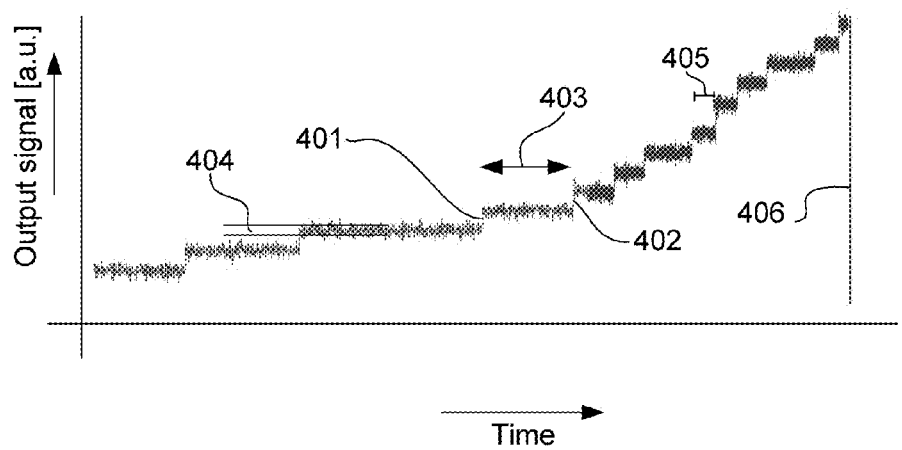
FIG. 4 schematically shows the signal produced by the solid state detector of FIG. 3.

It is further noted that the signal present on pin 310 is shown in FIG. 4.

FIG. 4 schematically shows the output signal of the silicon drift detector after the charge amplifier, at pin 310 (see FIG. 3).

The output signal, typically a voltage, shows a number of steps, for example steps 401 and 402, separated by an interval, for example interval 403. These steps are the result of a photon impinging on the diode. The height of the step varies, and is a measure for the energy of the photon. Clearly visible is the noise on the signal between the steps, with a peak-to-peak value 404. The signal can be filtered or smoothed during the interval between steps, resulting in a value with a lower variance than the variance of an interval that is smoothed over a smaller interval. The variance of the step height of step 401 is thus smaller than the variance of the step height of step 405, as step 401 is surrounded by two intervals that are longer than the two intervals surrounding step 405.

It is further shown that, when the signal exceeds a predetermined level, the charge amplifier is reset, resulting in a drop of the signal 406.

Figure 5:
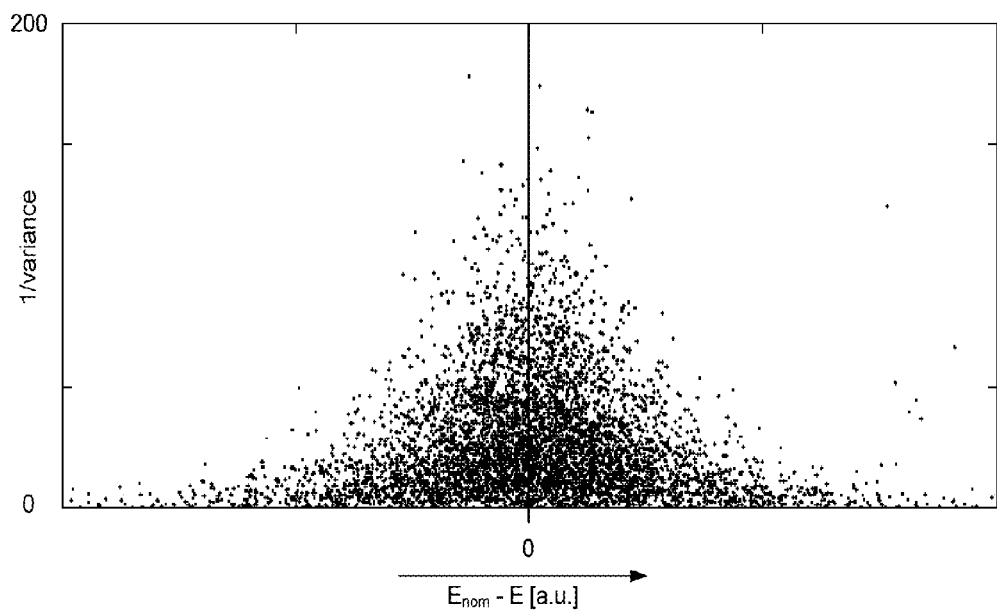
FIG. 5 schematically shows the result of the 1/variance of the steps determined from a simulated signal.

FIG. 5 schematically shows the result of the 1/variance of the steps determined from a simulated signal.

A simulation of a signal is modeled showing a realistic model of noise, containing four distinct components:

1. Series noise at the amplifier input. This is the white noise present at the input of the gate of the first FET. Root cause is the noise in the drain current of the FET which is modeled as a series noise voltage at the input.
2. Parallel noise at the input. These are the white noise sources parallel with the detector, comprising FET gate leakage currents and thermal noise sources of the resistances parallel at the input.
3. One-over-f noise (1/f noise) at the input of the FET.
4. Fano-noise: As a result of Fano noise the step height shows a further variance, with a full-width-at-half-maximum of $FWHM_{fano}=2.355\ (\epsilon E\ F)^{1/2}$, with $\epsilon$=ionization energy of the semiconductor material (for silicon 3.7 eV), E the energy of the impinging photon (for example 5.9 keV for the Mn $K_\alpha$ line) and F the Fano factor (for silicon: 0.115)

FIG. 5 is the result showing the variable (1/variance) for a simulated number of $10^4$ steps. It is noted that for a low count rate, thus a long average time between steps, the variance is low, and that for a high count rate, thus a short time between steps, the variance is high. The variance is also a function of the noise in the detector. Therefore the following simulation parameters are important when reproducing the simulations:

Input count-rate=$4\cdot 10^5$ counts/second;
Sensitivity frontend (amplifier) 1 mV/keV;
Sample time=25 ns;
Noise density (after preamp): 6 nV/√Hz (Broadband white noise);
Leakage current: 10 fA;
Minimum time average: 25 ns;
Maximum time average: 12.5 μsec.

FIG. 6 schematically shows the results of a (simulated) output signal using three different shapers, obtained from the same input signal.

The input signal is a simulated signal with three spectral lines at 100 eV, 170 eV and 300 eV.

Figure 6A:
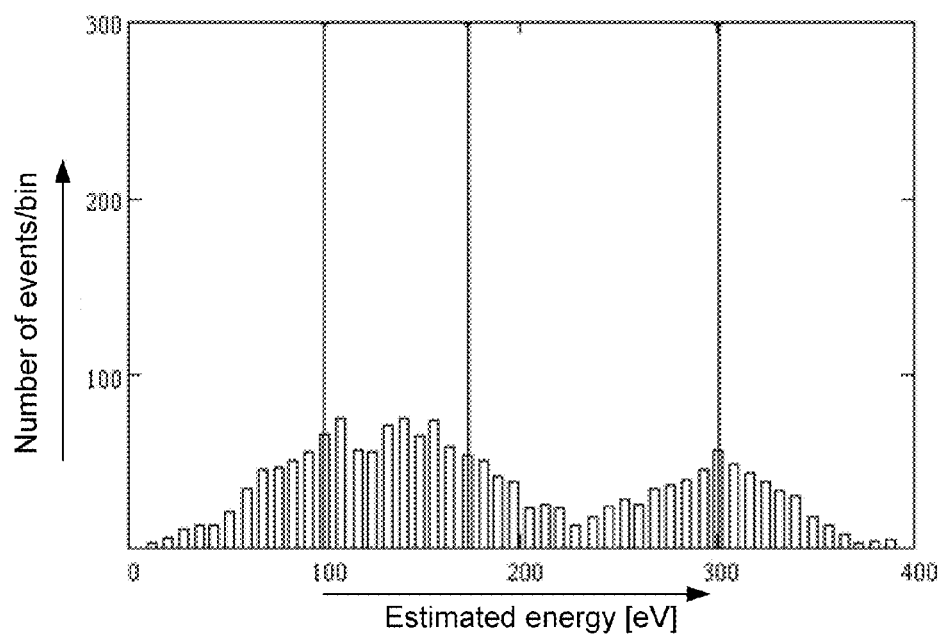
FIGS. 6A, 6B and 6C schematically show the results of a simulated output signal using three different shapers, obtained from the same input signal.
Figure 6B:
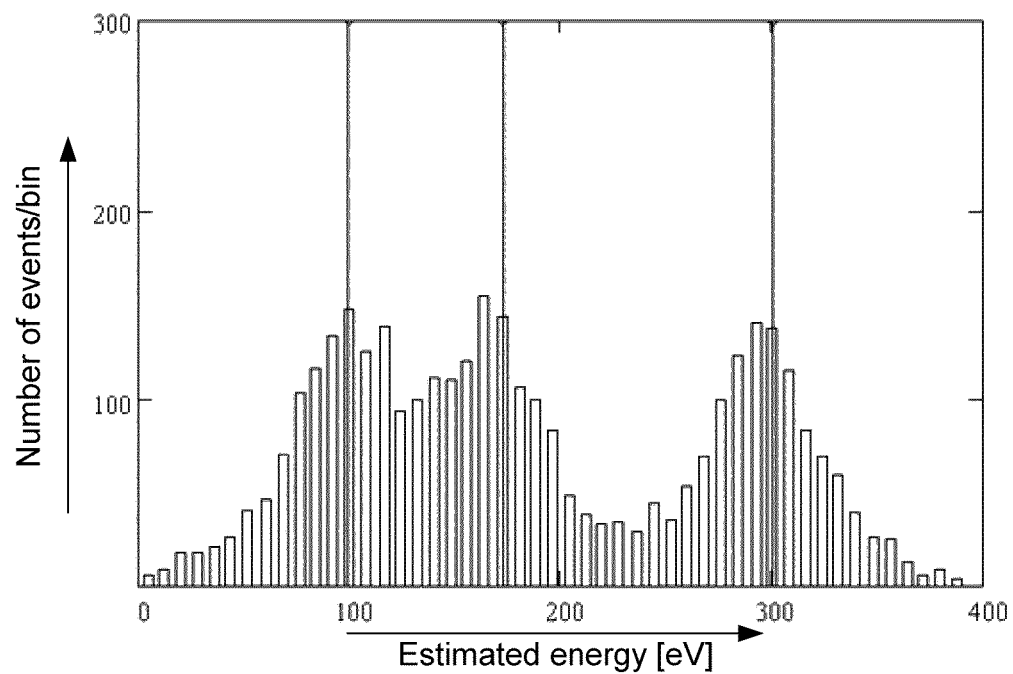

In FIGS. 6A and 6B a number of bins or intervals are arranged along the horizontal or energy axis. Vertical is the number of events in each of the bins or energy intervals.

Figure 6C:
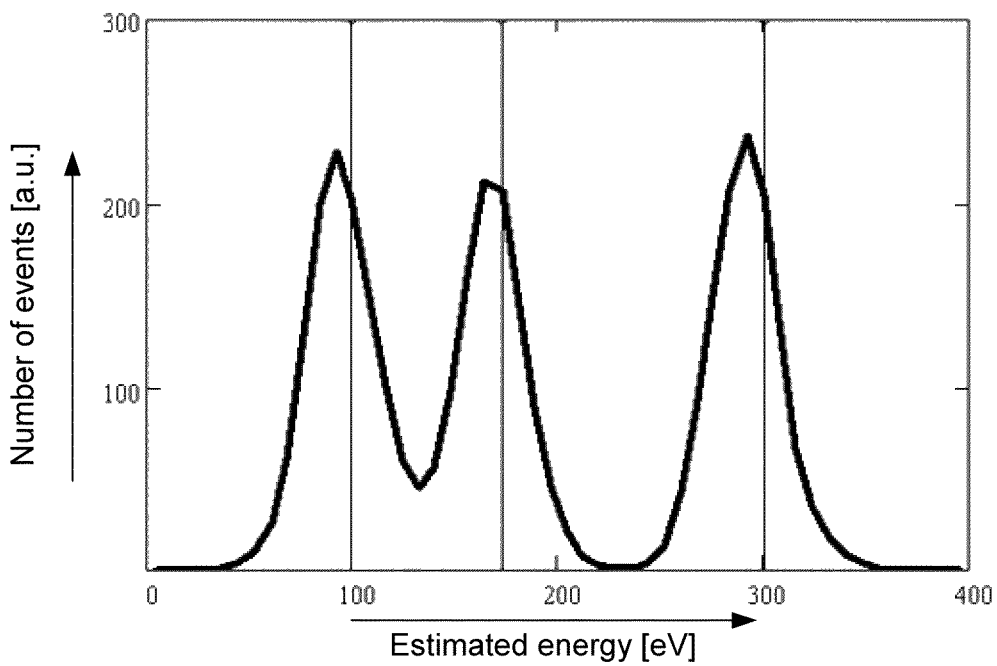

In FIG. 6C each event is represented by a Gaussian curve with a variance σ according to the estimated variance, scaled by $1/\sigma^2$. It is noted that a Gaussian has a unity integral, and thus a Gaussian with a smaller variance has a higher peak value than a Gaussian with a higher variance. By scaling (multiplying) it with $1/\sigma^2$, the integral of the curve is modulated FIG. 6A is the output signal obtained using a fixed filter with a time constant τ=0.5 μs, FIG. 6B the output signal obtained using an adaptive filter with a time constant τ between 200 ns and 25 μs and FIG. 6C the output signal obtained using weighted filtering according to the invention. Using the fixed filter, only 1676 events were registered, the rest being lost by pile-up: the next event(s) arriving within the filter time. Pile-up can be detected, and typically results in two (or more) pulses being rejected. As shown in FIG. $6^a$, the statistics of this output signal are poor, and the energy lines at 100 and 170 eV cannot be resolved.

FIG. 6B is the output signal obtained using an adaptive filter with a time constant τ between 200 ns and 25 μs. Using the adaptive filter 3452 events are registered. The three energy lines at 100, 170 and 300 eV can be resolved.

Using the weighted filter according to the invention, 3488 events are registered, almost the same as registered with the adaptive filter. The curve is the result of the addition of a number of Gaussians, each with a variance σ as determined for the corresponding event, multiplied by $1/\sigma^2$. Hereby the events with a low variance, and thus a high reliance, are emphasized. This implies that events with a value close to the "real" value, often showing a low variance, are emphasized. The addition of all these Gaussian curves results in an output signal where the intended energies are emphasized, and the peaks at 100 and 170 eV are far better resolved.

Figure 7:
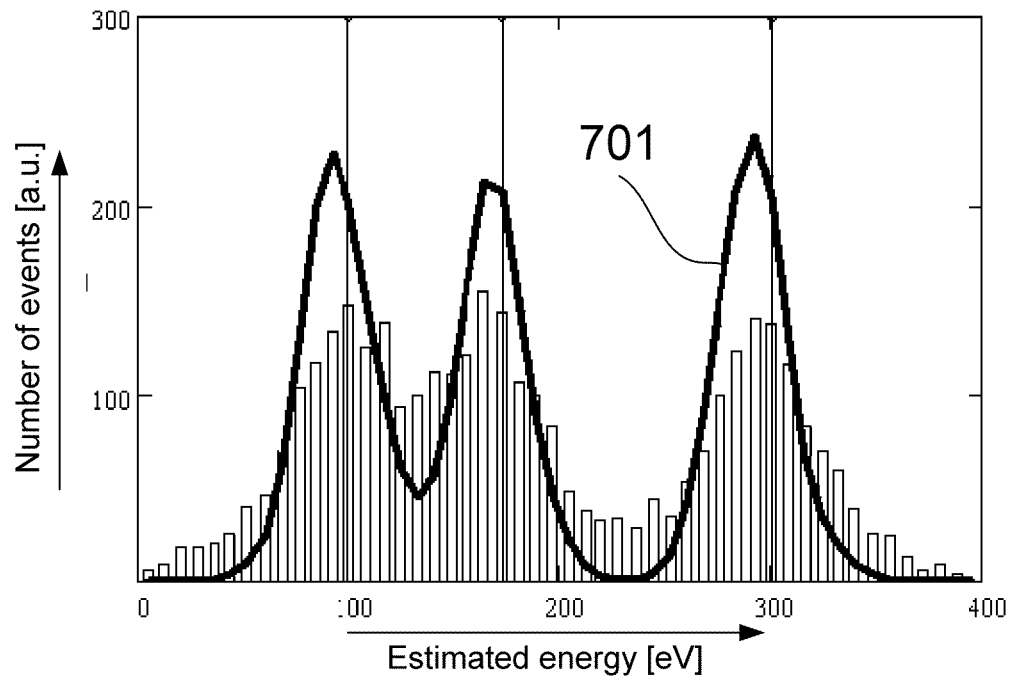
FIG. 7 schematically shows a comparison of spectra obtained from an input signal using a adaptive filter and a filter according to the invention.

FIG. 7 schematically shows a comparison of spectra obtained from an input signal using a adaptive filter and a filter according to the invention.

FIG. 7 schematically shows a comparison of the output signal obtained from a simulated input signal comprising ca. $6 \cdot 10^5$ samples or events, using the adaptive filter with a time constant $\tau$ between 200 ns and 25 µs (also used in FIG. $6^b$), and the weighted filter according to the invention. The bars shown correspond to the bins in which the results of the adaptive filter are represented, while the curve 701 is the addition of all the Gaussians multiplied by a weight factor resulting from the weighted filtering. As can be seen the output signal 701 according to the invention is better resolved and better defined than the signal obtained with adaptive filtering.

It is noted that preferably a Gaussian multiplied by an emphasis factor is used for each of the steps. However, during experimentations also other distributions are successfully used in which a lower variance resulted in a higher peak-value. A very useful distribution is, for example, a bar with a standard width and a height that is a function of the variance, to be added/integrated in a histogram (like the bars obtained in the prior art method).

Figure 8:
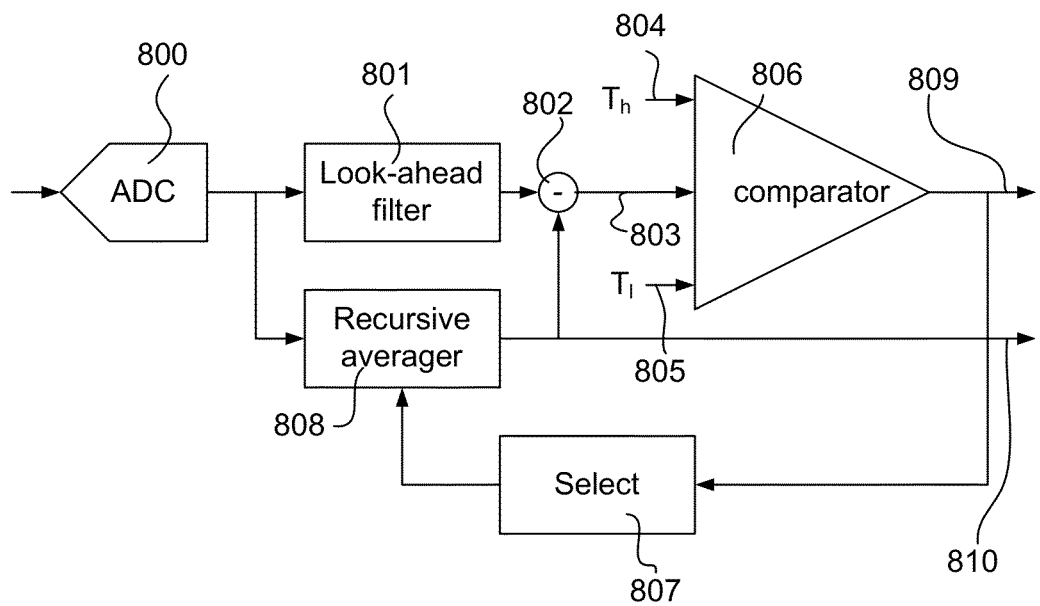
FIG. 8 schematically shows a one-dimensional recursive bilateral filter

FIG. 8 schematically shows a one-dimensional recursive bilateral filter.

Crucial to this method is the reliable detection of the events in the input signal. This also holds for fixed time shapers. The challenge is to detect the presence of a step in a shortest possible time to avoid pile up counts. This is usually done by sampling the signal and use a short FIR filter (typically 100 . . . 200 nsec) followed by a comparator with threshold. A compromise needs to be made between lower detection limit and false triggering by noise spikes. A too low value for the threshold leads to a huge zero volt peak which is caused by erroneous triggering. A too high value of the threshold leads to missed pulses. Modern shapers often use a combination of various fixed width shapers, see for example U.S. Pat. No. 7,855,370B1.

Here we present an idea that aims to lower the threshold value and still maintain a good pile up detection. The idea uses a one-dimensional recursive bilateral filter that continuously adapts its filter bandwidth to the deviation of "future" input samples with the actual output of the filter.

Effectively the operation is as follows:

The input signal is sampled by an analog-to-digital convertor (ADC) 800, resulting in an output signal S(t). A look-ahead filter 801 effectively averages n samples, for example four samples. The look-ahead filter is preferably a FIR or IIR filter, for example having a transfer function $U(t)=U(t-\Delta)+(S(t+\Delta)-S(t))/n$, in which S(t) is the output signal of the ADC, U(t) the output signal of the look-ahead filter at time t, and $\Delta$ the time difference between samples.

The signal is also averaged by a recursive average 808, having a transfer function $V(t)=V(t-\Delta)+\alpha \times [S(t)-V(t-\Delta)]$, in which V(t) is the output signal of the recursive filter at time t and $\alpha$ the filter constant.

the output signals of both filters are subtracted from each other in subtractor 802. When the input signal does not vary too much the output 803 of the subtractor is below a predefined upper threshold $T_h$ 804. In this case comparator 806 outputs a signal 809 that, via selector 807, forces the recursive average to use a low $\alpha$. This will result in a large noise suppression that will help in reduction of false triggers.

When the input signal rises the look-ahead filter immediately follows this and the signal of the subtractor rises above the threshold $T_h$. As a result the comparator is triggered, causing a signal indicating that a pulse is detected. At the same time a higher $\alpha$ value is taken for the recursive average, resulting in minimal filtering. This ensures a fast tracking of the input signal during the rise time of the input signal.

Once the difference of output signal with the look-ahead filter output is smaller than a predetermined lower threshold $T_l$ 805 the recursive average switches back to maximum filtering with low $\alpha$ constant.

The output signal 810 of the recursive average 808 can be used for further processing and determining the step height, although also the output signal of the ADC 800 can be used. The output 809 of the comparator 806 can be used for pile-up detection etc.

With this pulse detector a very low energy threshold level can be set, corresponding to approximately $2\sigma$ noise, and a 95% success rate and 5% false alarm rate is achieved. In a practical setup a threshold level around 100 eV (below Beryllium). This is much lower than encountered in current processors/methods.

As recognized by the person skilled in the art a constant slope in the incoming signal caused by leakage currents in the detector and all sorts of electronic offsets leads to errors in the step height estimation. For fixed shapers this only leads to a constant error. For an adaptive shaper, since the lengths of the plateaus vary, this will cause noise in the output result.

For an adaptive shaper it is thus important to continuously measure the slope and correct for it by means of a servo control loop. Preferably a slope value is calculated on each plateau by dividing the length of the plateau in three equidistant parts of which the first and last are subtracted. This gives an estimate which is very close to the ideal least means square line fit. It is worthwhile to mention that this method differs from the method described in U.S. Pat. No. 8,039,787B2 where an improved method for slope determination is described by dividing the single plateau in two sections. In fact, the division in three regions (and not in two as described in the patent) is the optimal method in terms of accuracy and white noise if the ideal least mean square fit is considered to be too expense in terms of FPGA (Field Programmable Gate Array) resources.

Depending on the noise characteristics of the signal, the presence of LF variations (drift) and possible interferences 100 Hz hum, etc there might be a need to do local corrections with the actual slope values.

It is further noted that in an extreme the method involves abandoning values with a variance above a (predetermined) value (low reliability). Although this implies throwing away data, the effect is less severe than may be expected, as the abandoned data is by definition unreliable data.

It is further noted that it is often beneficial to put an upper limit to the filter periods to avoid for example the effect of low frequency noise (e.g. flicker noise), and also to eliminate the effect of current leakage in the detector (often a reverse-biased diode). This does not imply that independent from the signal processing described here, an estimate of current leakage cannot be made: typically the signal processing starts with sampling and digitizing the data, and thus all data is available for any processing required.

It is noted that in aforementioned examples an X-ray detector, more specifically a SDD, is used as the sensor producing the signal. As known to the person skilled in the art other sensors for detecting the energy of an event, such as radiation sensors for detecting (deep)-UV photons, or particulate radiation comprising, for example, neutrons, electrons or ions, produce a similar signal. Together such sensors are referred to as radiation sensors.

We claim as follows:

1. A method for analyzing a signal of a radiation sensor, the method comprising:
   - detecting a signal from a radiation sensor;
   - identifying the presence of a multitude of steps in the signal from the radiation sensor, the steps being randomly spaced apart by signal plateaus;
   - filtering the signal plateaus;
   - estimating the height of each step;
   - forming a density distribution or a histogram based on the estimated heights; and
   - determining the composition from the density distribution or histogram;
   - wherein a variance of the height of each step is estimated using an estimate of the variance of the signal plateau preceding the step and an estimate of the variance of the signal plateau following the step, the estimate of the variance of each of the signal plateaus based on the length of time over which the signal plateau occurs; and
   - each of the multitude of steps contributing to the density distribution or histogram according to a weight factor, the relationship between the weight factor and the step height variance being such that the value of the weight factor increases as a function of decreasing step height variance.

2. The method of claim 1 in which estimating the variance of the signal plateaus further involves taking into account a noise model of the signal analyzed.

3. The method of claim 1 in which the signal from the radiation sensor is the signal of a solid state device and the multitude of steps in the signal occur as a result of X-ray photons impinging on said solid state device.

4. The method of claim 3 in which the height of a step represents the energy of an X-ray photon impinging on the solid state device.

5. The method of claim 1 in which the contribution of each step to the density distribution or histogram takes the form of a contribution proportional to a probability density function times a weight factor that depends on the variance.

6. The method of claim 5 in which the probability density function is a Gaussian probability density function.

7. The method of claim 1 in which the weight factor equals zero for steps with an estimated height variance above a predetermined threshold.

8. The method of claim 1 in which occurrences of the steps are detected using a one-dimensional recursive bilateral filter.

9. The method of claim 1 in which a baseline correction is applied to the steps baseline correction is applied.

10. An apparatus for observing X-rays emerging from a sample in response to a stimulus, the apparatus comprising:
    - an X-ray detector, the X-ray detector being a solid state device or a gas proportional counter, the X-ray detector configured to produce a signal in which X-rays detected by the X-ray detector are represented as steps spaced apart by signal plateaus; and
    - a signal processor programmed to process the signal, the signal processor programmed to detect the presence of the steps in the signal, estimate the time intervals over which the signal plateaus occur, filter the signal plateaus, estimate the heights of the steps, and form a density distribution or histogram from the estimated heights of the steps,
    - wherein the signal processor is programmed to estimate, for each step, a variance of the height of the step using an estimate of the variance of the signal plateau preceding the step and an estimate of the variance of the signal plateau following the step, the estimate of the variance of each signal plateau is based on the length of the time interval over which the signal plateau occurs, and is equipped to assign a weight factor to each of the steps contributing to the density distribution or histogram, the weight factor being a function of the step height variance.

11. The apparatus of claim 10 in which the signal processor is further equipped to use a noise model of the signal to estimate the variance of the signal plateaus.

12. The apparatus of claim 10 in which the signal processor is a programmable signal processor.

13. The apparatus of claim 10 in which the stimulus is an energetic beam of electrons or a beam of X-rays.

14. The apparatus of claim 10 further comprising a one-dimensional recursive bilateral filter.

15. The apparatus of claim 10 in which the signal processor is programmed such that the contribution of step to the density distribution or histogram takes the form of a contribution proportional to a probability density function times weight factor.

16. The apparatus of claim 15 in which the probability density function is a Gaussian probability density function times.

17. The apparatus of claim 10 in which the weight factor equals zero for steps an estimated height variance above a predetermined threshold.

18. The apparatus of claim 10 in which the signal processor is programmed to apply a baseline correction to the signal plateaus.

* * * * *